United States Patent
Yonemura et al.

[11] Patent Number: 6,158,824
[45] Date of Patent: *Dec. 12, 2000

[54] BRAKE CONTROL APPARATUS FOR A VEHICLE

[75] Inventors: Shuichi Yonemura, Anjo; Yoichi Abe, Kariya; Mamoru Sawada, Yokkaichi, all of Japan

[73] Assignee: Denso Corporation, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/826,809

[22] Filed: Mar. 25, 1997

[30] Foreign Application Priority Data

Mar. 27, 1996 [JP] Japan ................................ 8-072429

[51] Int. Cl.⁷ ............................................ B60T 8/38
[52] U.S. Cl. ................... 303/113.5; 303/155; 303/113.4
[58] Field of Search ................ 303/11, 9.63, 113.4, 303/113.5, 116.1, 116.2, DIG. 1–4, 155

[56] References Cited

U.S. PATENT DOCUMENTS

| | | | |
|---|---|---|---|
| 4,547,022 | 10/1985 | Brearley et al. | 303/113.5 |
| 4,826,255 | 5/1989 | Volz | 303/113.4 |
| 4,969,697 | 11/1990 | Lindenmann | 303/113.5 |
| 5,021,957 | 6/1991 | Yoshino et al. | 303/113.5 |
| 5,333,944 | 8/1994 | Shirai et al. | 303/116.2 |
| 5,350,225 | 9/1994 | Steiner et al. | |
| 5,427,442 | 6/1995 | Heibel | |
| 5,564,797 | 10/1996 | Steiner et al. | |
| 5,586,814 | 12/1996 | Steiner | 303/116.2 |
| 5,779,329 | 7/1998 | Takeshima et al. | 303/113.4 |

FOREIGN PATENT DOCUMENTS

| | | |
|---|---|---|
| 0 436 926 | 7/1991 | European Pat. Off. |
| 41 02 497 | 5/1992 | Germany |
| 44 18 043 | 7/1995 | Germany |
| 59-081243 | 5/1984 | Japan |
| 4-121260 | 4/1992 | Japan |
| 2252373 | 8/1992 | United Kingdom ................ 303/116.2 |

Primary Examiner—Matthew C. Graham
Attorney, Agent, or Firm—Pillsbury Madison & Sutro LLP

[57] ABSTRACT

An operated quantity of a brake pedal is detected based on a signal from a stroke sensor. A starting criterion to start brake assisting is determined with respect to an operational speed of the brake pedal in response to the operated quantity of the brake pedal. An operated-quantity change is calculated by differentiating the operated quantity of the brake pedal. It is determined whether the operated-quantity change exceeds the starting criterion. If the operated-quantity change exceeds the starting criterion, brake assisting is started by driving a pump to increase wheel cylinder pressure.

17 Claims, 9 Drawing Sheets

BRAKE CONTROL APPARATUS FOR A VEHICLE

CROSS REFERENCE TO RELATED APPLICATION

The present invention is based upon and claims the benefit of priority of the prior Japanese Patent Application No. Hei 8-72429 filed on Mar. 27, 1996, the contents of which are incorporated by reference.

BACKGROUND OF THE INVENTION

1. Field of the Invention

The present invention relates to a vehicular brake control apparatus exhibiting a high braking force, and more particularly, to a brake control apparatus which can provide, to wheel cylinders, a brake-fluid pressure higher than master-cylinder pressure generated by a master cylinder, in a case where obtaining higher braking force is desirable on a road having a high friction coefficient or the like.

2. Related Arts

U.S. Pat. No. 5,427,442 discloses a brake fluid pressure boosting apparatus for an automobile which boosts brake-fluid pressure applied to wheel cylinders to obtain optimal braking force. In the brake fluid pressure boosting apparatus, a boosting effect due to a brake-pressure booster is intensified in a state of panic braking wherein a driver hesitates to depress a brake pedal with maximum force. As a result, wheel-cylinder pressure larger than normal in response to a driver's pedal-depression force is applied to the wheel cylinders and a high braking force is secured.

The prior art apparatus, however, increases wheel-cylinder pressure by intensifying the boosting effect only in a case where a pedal-depression force increase gradient is higher than a predetermined increase gradient.

Further, U.S. Pat. No. 5,350,225 discloses a braking force amplifying apparatus which amplifies a braking force when a moving speed of a brake pedal caused by a driver's depressing operation exceeds a predetermined threshold value. This apparatus, however, is not effective enough in all cases either. For example, when a driver further depresses the brake pedal from a state that the brake pedal has been depressed to some extent, because the brake pedal can not move over a long distance, a moving speed of the brake pedal does not become high enough to exceed the predetermined threshold value. Therefore, even if the apparatus has the structure that can realize higher wheel-cylinder pressure, the desirable high braking force can not always be obtained.

SUMMARY OF THE INVENTION

It is an object of the present invention to provide a brake control apparatus for a vehicle which can reliably ensure high braking force when a higher braking force is required, just like a sudden braking in a panicked situation.

To achieve this object, the brake control apparatus for a vehicle according to the present invention has a brake fluid pressure generating device (e.g., master cylinder) which generates a first brake fluid pressure in response to a driver's depressing force applied to a brake pedal and a brake assisting device which generates a second brake fluid pressure higher than the first brake fluid pressure and provides the second brake fluid pressure for a braking force generating device (e.g., wheel cylinder) to cause a braking force to generate at a wheel. Specifically, the present invention has an operation detecting device which detects a value corresponding to an operated quantity of the brake pedal, a starting criterion changing device which changes a starting criterion to determine whether the brake assisting device starts brake assisting and a starting device which causes the brake assisting device to start the brake assisting when a physical quantity varied in response to braking state has reached the starting criterion.

Accordingly, when the driver further depresses the brake pedal from a state that the brake pedal has been depressed to some extent for example, even if the operated speed of the brake pedal does not become high, the brake assist can be performed. As a result, large braking force can be assured as the driver intends. That is, the large braking force can be assured regardless of a depressed state of the brake pedal.

When the value corresponding to the operated quantity of the brake pedal has reached a predetermined determination value, the brake assisting device may start the brake assisting. That is, the predetermined determination value as a starting criterion is not changed, and it is determined that the brake pedal is deeply depressed and a sudden braking is made when the value corresponding to the operated quantity of the brake pedal is large to some extent. Accordingly, brake assisting is started to increase braking force. As a result, sufficient braking force can be obtained when a large braking force is necessary. Further, the operational processing required for braking force control can be simplified.

Further, as a pedal stroke becomes large, because reaction force from the brake pedal also becomes large, the driver has a difficulty of depressing the brake pedal further. Moreover, the brake pedal may be pushed back due to the reaction force and large braking force can not be maintained on in contradiction to the driver's intention. Therefore, the starting criterion of the brake assist is substantially set to a pedal position that the brake pedal is started to be pushed back due to the reaction force. As a result, a large braking force can be maintained.

A depressed position of the brake pedal can be adopted as the value corresponding to the operated quantity of the brake pedal. The depressed position indicates a present position of the brake pedal, which can be detected by various kinds of electrical, magnetic and optical sensors.

A pedal stroke of the brake pedal can also be adopted as the value corresponding to the operated quantity of the brake pedal. The pedal stroke is a quantity of movement of the brake pedal from a reference position of the brake pedal which is the position, for example, that the brake pedal has not been depressed yet. The quantity of movement of the brake pedal from the reference position (depressed quantity) can be detected by a stroke sensor or the like.

A master cylinder pressure can be adopted as the value corresponding to the operated quantity of the brake pedal. The master cylinder pressure can be detected by various kinds of pressure sensors that can detects brake fluid pressure.

Depressing force on the brake pedal can be adopted as the value corresponding to the operated quantity of the brake pedal. The depressing force can be detected by various kinds of pressure sensors that can detect a pushing force.

An operational speed that is the change of the various kinds of operated quantities per unit time can be used as the starting criterion. For example, in a case where a moving speed of the brake pedal (operational speed) is used as the starting criterion, when the moving speed of the brake pedal exceeds a predetermined threshold value (a certain starting criterion), the brake assisting is started.

An operational acceleration that is the change of the operational speed per unit time can be used as the starting criterion. For example, in a case where moving acceleration of the brake pedal (operational acceleration) is used as the starting criterion, when the moving acceleration of the brake pedal exceeds a predetermined threshold value (a certain starting criterion), the brake assisting is started.

The deceleration of a vehicle body can be used as the starting criterion. That is, when the deceleration of the vehicle body detected by a deceleration sensor has reached a predetermined deceleration determination value, the brake assisting is started. In this case, the starting criterion is not changed. The deceleration of the vehicle body is detected by, for example, G sensor and if the deceleration of the vehicle body is large, it can be determined that the brake pedal is deeply depressed and the sudden braking is made. Therefore, the brake assisting is started to increase braking force. As a result, sufficient braking force can be obtained when large braking force is necessary and the operational processing required for braking force control can be simplified.

It is to be noted that a brake booster can be used as the brake assisting device. That is, when the brake assist is needed, the brake booster is driven to generate higher master cylinder pressure (i.e. wheel cylinder as well) than normal. As a result, braking force can be increased.

Further, a pressure amplifying device can be used as the brake assisting device. The pressure amplifying device can be composed of a pump and proportional control valve connected in reverse. In this case, the pump moves brake fluid from the brake fluid pressure generating device side to the braking force generating device side. As a result, the first brake fluid pressure is decreased due to a quantity of brake fluid moved by the pump, and the second brake fluid pressure is increased due to the moved brake fluid. Therefore, the braking force generating device can increase braking force based on the increased second brake fluid pressure.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

(FIRST EMBODIMENT)

A first embodiment of a brake control apparatus according to the present invention will be described hereinafter with reference to the drawings.

Figure 1:
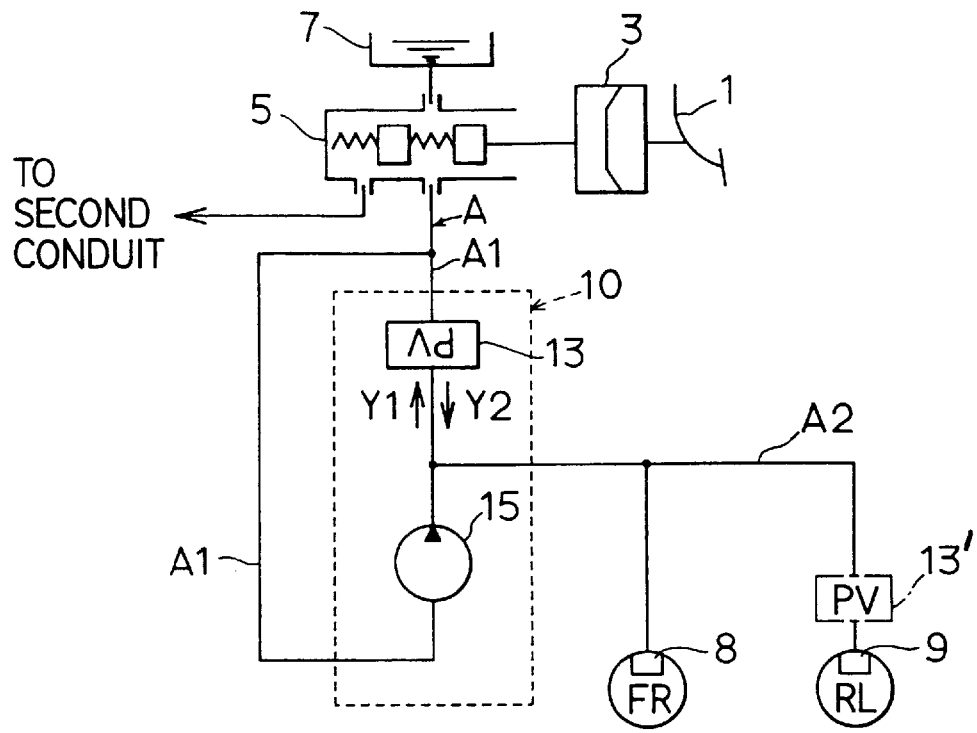
FIG. 1 is a model diagram indicating a structure of a brake control apparatus according to a first embodiment of the present invention.

FIG. 1 is a structural view indicating the first embodiment according to the present invention. In the first embodiment, the brake control apparatus is applied in a vehicle of a diagonal brake-fluid conduit system provided with respective brake-fluid conduits of connecting front-right wheel cylinder with rear-left wheel cylinder and connecting front-left wheel cylinder with rear-right wheel cylinder in a front-wheel drive four-wheeled vehicle.

In FIG. 1, a brake pedal 1 depressed by a driver when applying braking force to the vehicle is connected to a booster 3, and depression force applied to the pedal 1 and pedal stroke thereof are conveyed to this booster 3. The booster 3 has at least two chambers, a first chamber and a second chamber. The first chamber can be set, for example, as an atmospheric-pressure chamber and the second chamber can be set as a vacuum chamber. Intake-manifold vacuum of an engine, vacuum generated by a vacuum pump or the like is employed as vacuum introduced in the vacuum chamber. Accordingly, this booster 3 directly boosts the driver's pedal depression or pedal stroke by a pressure differential of the atmospheric-pressure chamber and the vacuum chamber. The booster 3 has a push rod or the like to convey the depression force or pedal stroke boosted in this way to a master cylinder 5, and this push rod generates master-cylinder pressure PU by compressing a master piston disposed in the master cylinder 5. It is to be noted that, in the first embodiment, the booster 3 can be omitted.

The master cylinder 5 is provided with an independent master reservoir 7 to supply brake fluid inside the master cylinder 5 or to accumulate excess brake fluid from the master cylinder 5.

The master-cylinder pressure PU generated in the master cylinder 5 is conveyed to brake fluid within a first conduit A linking the master cylinder 5 and a first wheel cylinder (W/C) 8 disposed in the front-right wheel FR to impart braking force to this wheel, and the master 5 and a second wheel cylinder 9 disposed in the rear-left wheel RL to impart braking force to this wheel. The master-cylinder pressure PU is similarly conveyed also to a second conduit linking respective wheel cylinders disposed in the front-left wheel and the rear-right wheel to the master cylinder 5. However, because structure similar to the first conduit A can be employed for the second conduit, detailed description will be omitted.

The first conduit A is made up from two parts separated by a pressure-amplifying device 10 (as a power brake which performs a brake assist) disposed in this first conduit A. That is to say, the first conduit A has a first conduit part A1 to receive the master-cylinder pressure PU in the interval from the master cylinder 5 to the pressure-amplifying device 10 and a second conduit part A2 in the interval from the pressure-amplifying device 10 to the first wheel cylinder 8.

The pressure-amplifying device 10 moves brake fluid of the first conduit part A1 to the second conduit part A2 and holds the pressure in the second conduit part A2 at a second brake-fluid pressure PL when the brake pedal 1 is depressed and the master-cylinder pressure PU is generated within the first conduit A. According to this first embodiment, this pressure-amplifying device 10 is composed of a proportioning control valve (PV) 13 and a pump 15.

The pump 15 is connected within the first conduit A in parallel with the proportioning control valve 13, and takes in brake fluid from the first conduit part A1 and discharges brake fluid to the second conduit part A2 during generation of the master-cylinder pressure PU.

When brake fluid has been moved from the first conduit part A1 to the second conduit part A2 by the pump 15 and the brake-fluid pressure of the second conduit part A2 has become the second brake-fluid pressure PL which is greater than the master-cylinder pressure PU, the proportioning control valve 13 acts to maintain this differential pressure (PL−PU).

In this way, the pressure-amplifying device 10 provided with the pump 15 and the proportioning control valve 13 moves the brake fluid of the first conduit part A1 which has assumed the same pressure as the master-cylinder pressure PU accompanying depression of the brake pedal 1 to the second conduit part A2, reduces the brake-fluid pressure within the first conduit part A1. The pressure-amplifying device 10 simultaneously maintains the differential pressure of the amplified second brake-fluid pressure PL within the second conduit part A2 and the master-cylinder pressure PU. The pressure-amplifying device 10 performs pressure amplification in this way.

The second brake-fluid pressure PL which has been caused to be greater than the master-cylinder pressure PU is applied to the first and second wheel cylinders 8 and 9, so that high braking force is ensured.

It is to be noted that a proportioning control valve 13', as is well-known, (being the same as the proportioning control valve 13) may be disposed at the second conduit part A2 to operate so that the brake fluid pressure applied to the second wheel cylinder 9 becomes smaller than the brake-fluid pressure applied to first wheel cylinder 8. The proportioning control valve 13' is provided to prevent the rear wheel, as far as possible, from falling into a locking state earlier than the front wheel in a case where load movement of the vehicle of the like has occurred during vehicle braking. However, explanation about an example that the proportioning control valve 13' is omitted, hereinafter.

Next, function of the proportioning control valve 13 will be described in detail.

Figure 2A:
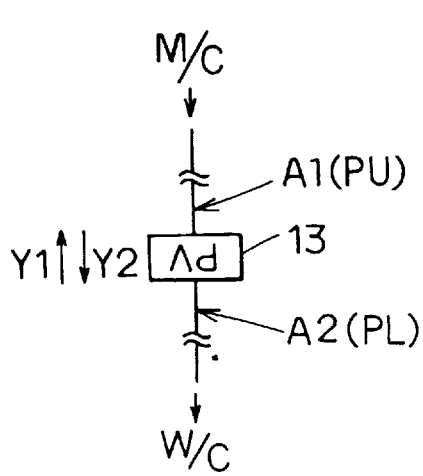
FIG. 2A is a drawing indicating detailed structure of a holding device in the first embodiment.
Figure 2B:
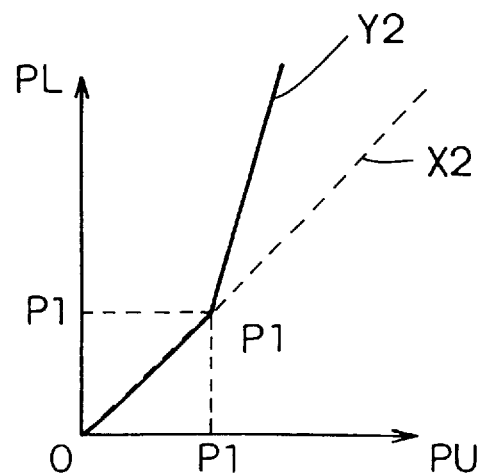
FIG. 2B is a graph illustrating characteristic of the holding device.

In the first embodiment, as shown in FIG. 2A, the proportioning control valve 13 is connected in reverse. The proportioning control valve 13 ordinarily acts to convey basic pressure of the brake fluid to a downstream side while attenuating the brake-fluid pressure with a predetermined attenuation ratio when the brake fluid is flowing in a normal direction (a direction of an arrow Y1 in FIG. 2A). Accordingly, when the proportioning control valve 13 is connected in reverse, the second conduit part A2 side comes to generate the foregoing basic pressure and the first conduit part A1 side becomes the downstream side when the brake fluid flows from the second conduit part A2 to the first conduit part A1 through the proportioning control valve 13. Accordingly, as shown in FIG. 2B, when the second brake-fluid pressure PL within the second conduit part A2 has become not less than split-point pressure P1 established for the proportioning control valve 13 accompanying increase in the brake-fluid quantity within the second conduit part A2 due to the drive of the pump 15, the second brake-fluid pressure PL within the second conduit part A2 is conveyed to the first conduit part A1 in accordance with the slope of line Y2, i.e., the predetermined attenuation ratio. Accordingly, when the master-cylinder pressure PU in the first conduit part A1 is seen as a reference, the second brake-fluid pressure PL increased by the drive of the pump 15 comes to be held by this proportioning control valve 13 in a state amplified in an inverse relationship with the above-described predetermined attenuation ratio.

When brake fluid flows from the first conduit part A1 to the second conduit part A2 through the proportioning control valve 13, brake-fluid pressure similar to the basic pressure is conveyed to the downstream side without performing attenuation of the brake-fluid pressure. In this case, the basic-pressure side of the proportioning control valve 13 is the first conduit part A1 side, and the downstream side is the second conduit part A2 side.

Next, a structure and the control processing to control the above-mentioned pressure amplifying device 10 and the like will be described.

Figure 3:
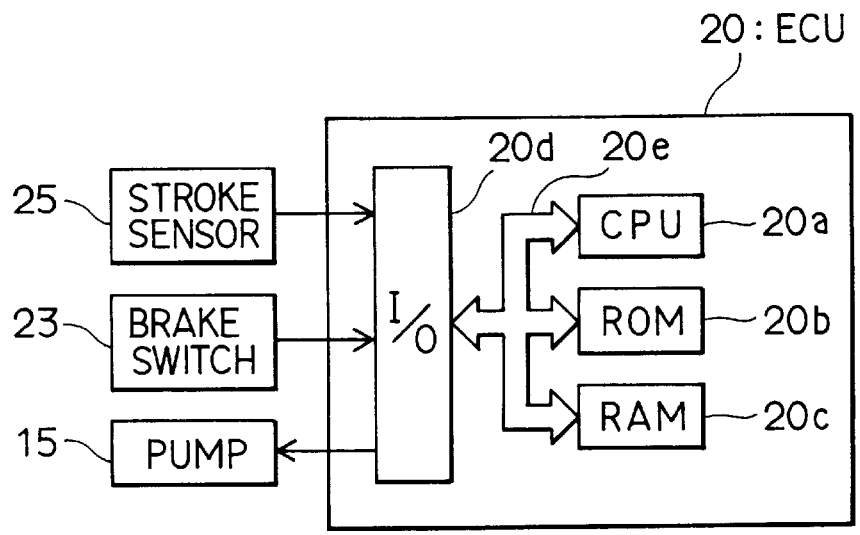
FIG. 3 is a block diagram indicating an electrical control unit of the first embodiment.

An electric control unit (ECU) 20 shown in FIG. 3 performs control for increasing braking forces of the wheels by the pressure amplifying device 10 moving the brake fluid from a master cylinder 5 side to first and second wheel cylinders 8 and 9 side.

The ECU 20 is structured as a micro computer provided with a CPU 20a, a ROM 20b, a RAM 20c, an input/output portion 20d, a bus line 20e, and the like of known art, as shown in FIG. 26.

A brake switch 23 to detect depression of the brake pedal 1 and pedal-stroke sensor 25 to detect the amount of depression of the brake pedal 1 are connected to the input/output portion 20d. The pedal-stroke sensor 25 detects the amount of depression of the brake pedal 1 from a reference position where the brake pedal 1 has not been depressed, i.e., the value corresponding to the present position of the brake pedal 1. In addition, the pump 15 which provides brake fluid for the second conduit part A2 in order to exhibit the high braking force due to the brake assist performed by the pressure amplifying device 10 is connected to the input/output portion 20d.

Figure 4:
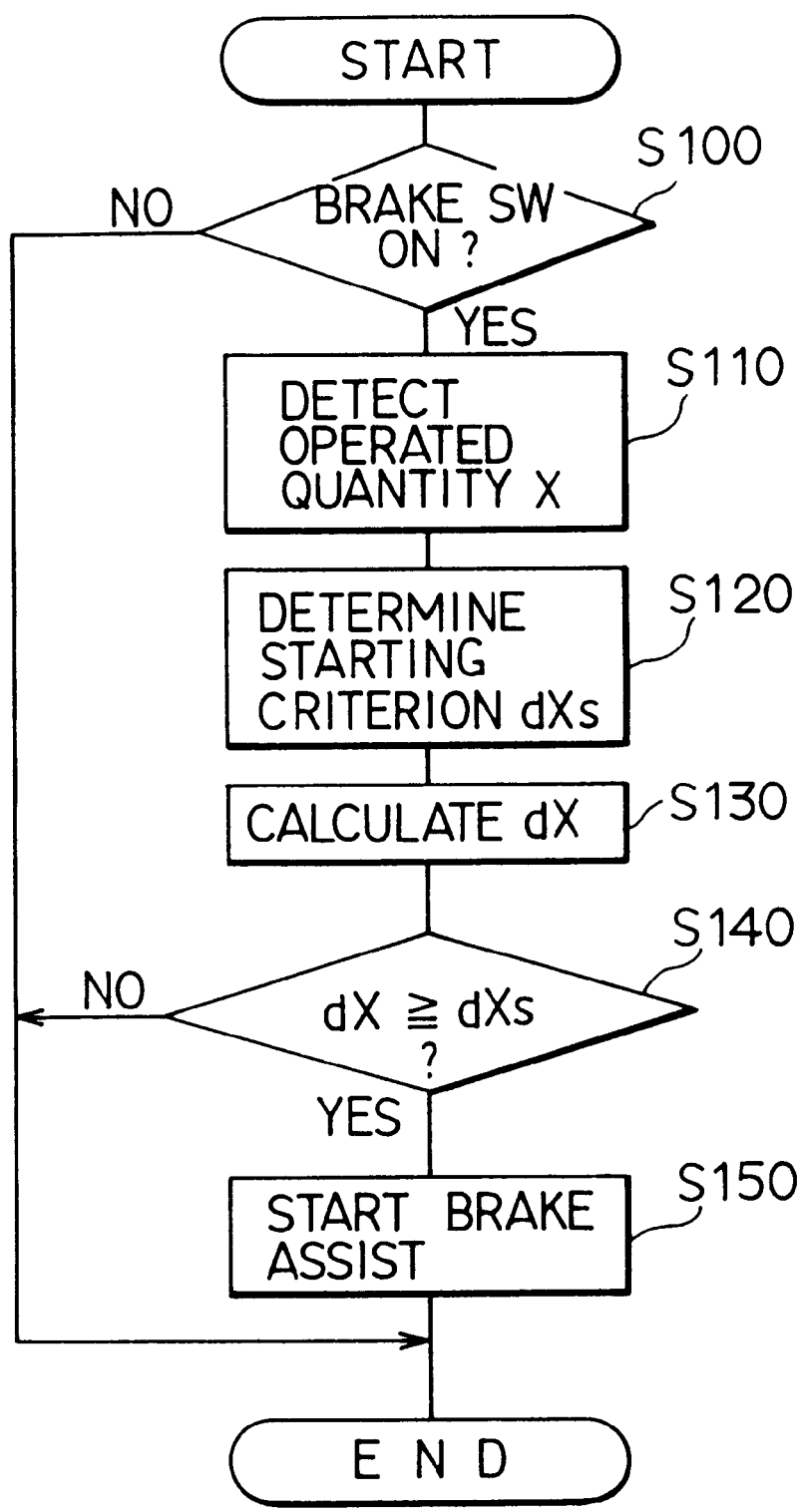
FIG. 4 is a flowchart indicating control processing of the first embodiment.

Processing control to change a starting criterion of the brake assist, performed in the ECU 20 will be described based on the flowchart in FIG. 4.

In step S100, it is determined whether the brake pedal 1 has been depressed by determining whether a brake switch 23 is on. When the determination herein is affirmative, the processing advances to step S110; when the determination is negative, the processing is terminated.

In step S110, an operated quantity X of the brake pedal 1 is detected on a basis of a signal from the stroke sensor 25. That is to say, the state of extent to which the brake pedal 1 has been depressed (i.e., the present position thereof) is determined.

Figure 5A:
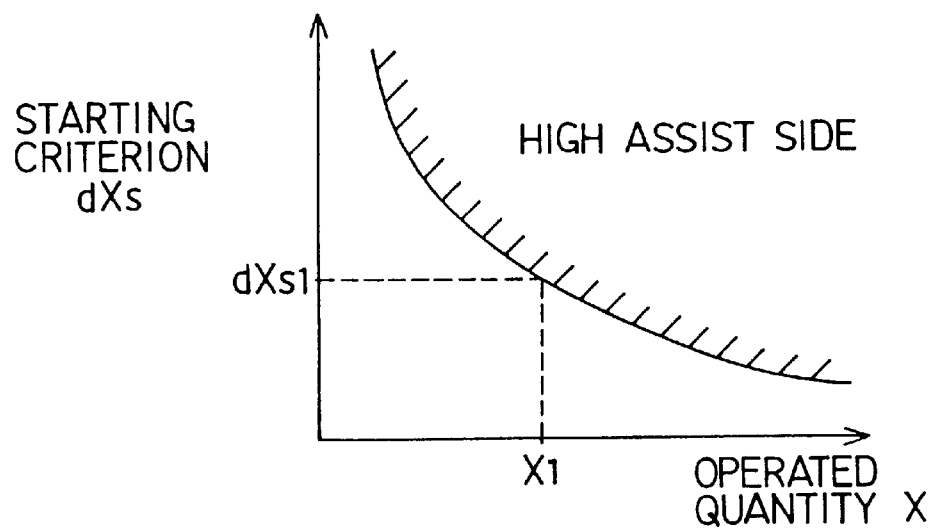
FIGS. 5A and 5B are explanatory diagrams indicating a starting criterion of the first embodiment.

Next, in step S120, a starting criterion dXs for starting brake assist is changed in accordance with the operated quantity X of the brake pedal 1. In more detail, the operation change-quantity threshold value (starting criterion) dXs corresponding to the operated quantity X is determined from a map of the operated quantity X and the operation change-quantity threshold value dXs such as is shown in FIG. 5A. The value is established as the operation change-quantity threshold value dXs.

Next, in step 130, the operated quantity X of the brake pedal 1 is differentiated and an operated-quantity change dX which is the movement speed (i.e., the operated speed) of the brake pedal 1 is calculated.

Next, in step S140, it is determined whether the operated-quantity change dX of the brake pedal 1 is the operation change-quantity threshold value dXs or more. When an affirmative determination is made herein, the processing advances to step S150; when a negative determination is made, the processing is terminated.

In step S150, the timing for starting the brake assist is obtained, and so the pump 15 is driven to increase wheel-cylinder pressure. As a result, brake assist is started, and the processing at this time is terminated.

In this way, according to this embodiment, in an apparatus provided with a power brake composed of the pressure-amplifying device 10, the position (operated quantity X) and speed (operated-quantity change dX) of the brake pedal 1 are determined. The operation change-quantity threshold value (starting criterion) dXs for starting the brake assist is changed in accordance with this operated quantity X. In a case where the operated-quantity change dX has become the operation change-quantity threshold value dXs or more, the brake assist is started.

Therefore, the brake assist can reliably be performed no matter what the state of depression of the brake pedal 1 may be, and so there exists a remarkable effect that sufficient braking force can be ensured. That is to say, in a state where braking force larger than the braking force during normal braking is requested, such as panicked sudden braking, large braking force can accurately be ensured.

For example, in a conventional apparatus, when the brake pedal 1 was depressed further from a state of being depressed to a certain extent, the starting criterion for starting the brake assist was not reached because the operated speed of the brake pedal 1 did not increase, and so it may have been unable to start brake assist. However, according to this embodiment, the starting criterion for starting the brake assist is changed (i.e., is reduced) in accordance with a state wherein the brake pedal 1 has been depressed to a certain extent, and so in a case of further depression, the pump 15 is promptly driven (i.e., drive of the pump 15 is started or the driving speed of the pump 15 is increased), and the brake assist can be started.

Figure 5B:
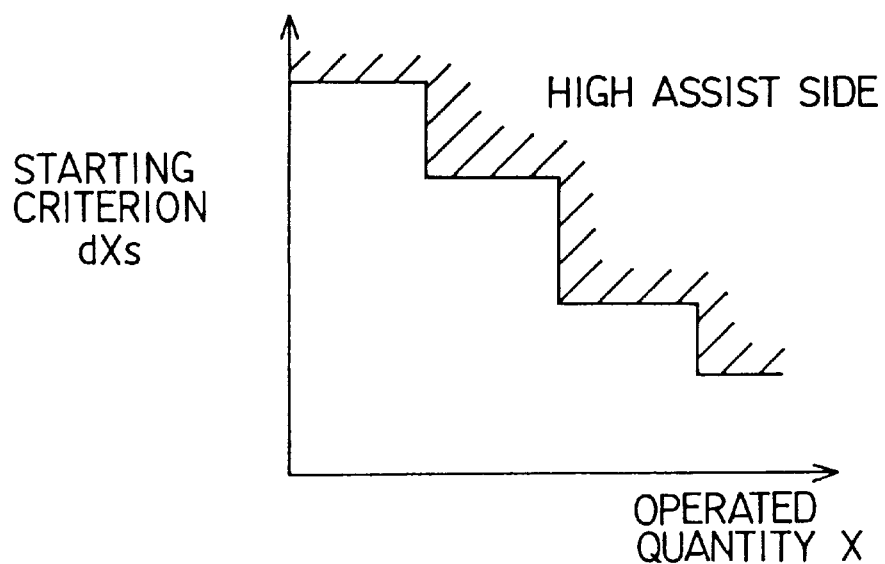

A stepped map, for example, as shown in FIG. 5B can be utilized as the map for changing this starting criterion dXs. In this case, there exists an advantage that the a small memory region in the ROM 12b is sufficient.

(SECOND EMBODIMENT)

A second embodiment of the present invention will be described next.

In this embodiment, the brake control apparatus having the same structure as that of the first embodiment can be employed, and so the control processing thereof will be explained. It is to be noted that the same device as that in the first embodiment is given the same number in the second embodiment.

Figure 6:
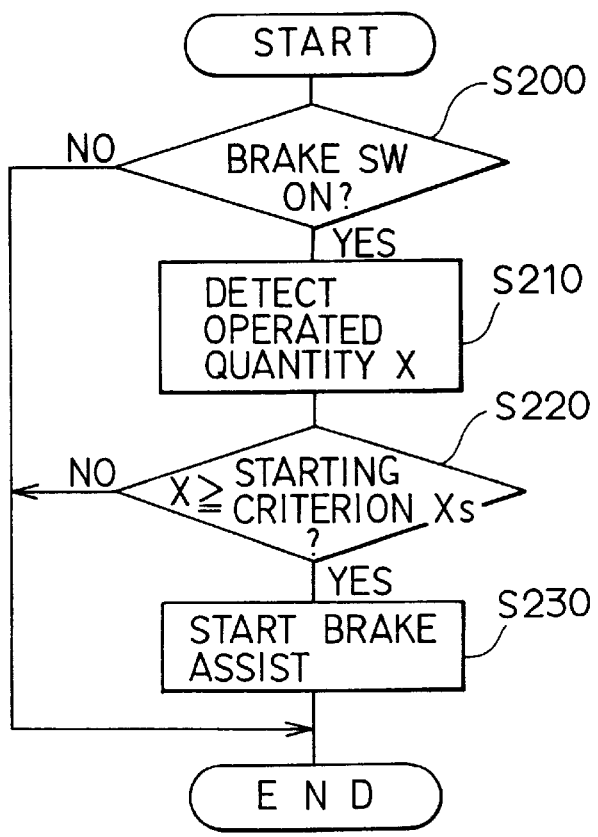
FIG. 6 is a flowchart indicating control processing of a second embodiment.

As indicated in the flowchart in FIG. 6, according to this embodiment, firstly, in step S200, it is determined whether the brake switch 23 is on. When the determination herein is affirmative, the processing advances to step S210; when the determination is negative, the processing is terminated.

In step S210, an operated quantity X indicating the present position of the brake pedal 1 is determined based on the signal from the pedal-stroke sensor 23.

Figure 7:
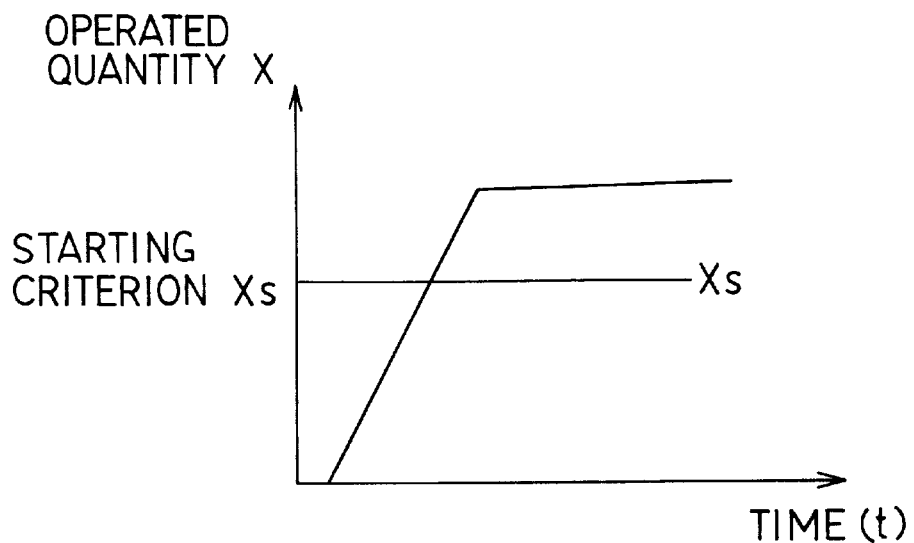
FIG. 7 is an explanatory diagram indicating a starting criterion of the second embodiment.

In step S220, it is determined whether the operated quantity X of the brake pedal 1 is a predetermined operated quantity threshold value (starting criterion) Xs or more. In detail, it is determined whether the operated quantity X which varies with the passage of time as shown in FIG. 7 has reached the operated quantity threshold value (starting criterion) Xs. When the determination herein is affirmative, the processing advances to step S230; when the determination is negative, the processing is terminated.

In step S230, because the timing for starting the brake assist has been obtained, the wheel cylinder pressure is increased by driving the pump 15, thereafter the processing is terminated.

In this way, in the brake control apparatus provided with the power brake composed of the pressure amplifying device 10, the position (operated quantity X) of the brake pedal 1 is determined, and when the operated quantity X has reached the operated quantity threshold value (starting criterion) Xs for starting the brake assist, the brake assist is started.

Therefore, in the same manner as the first embodiment, the brake assist can reliably be performed no matter what the state of depression of the brake pedal 1 may be, and so there exists a remarkable effect that sufficient braking force can be ensured. In addition, because the second embodiment does not perform processing of calculating operated quantity change or of changing the operation change-quantity threshold value, the burden due to the processing can be reduced.

(THIRD EMBODIMENT)

A third embodiment of the present invention will be described next.

In this embodiment, the brake control apparatus having the same structure as that of the first embodiment can be employed, and so the control processing thereof will be explained. It is to be noted that the same device as that in the first embodiment is given the same number in the third embodiment. In the third embodiment, the control processing of the first embodiment is combined with the control processing of the second embodiment.

Figure 8:
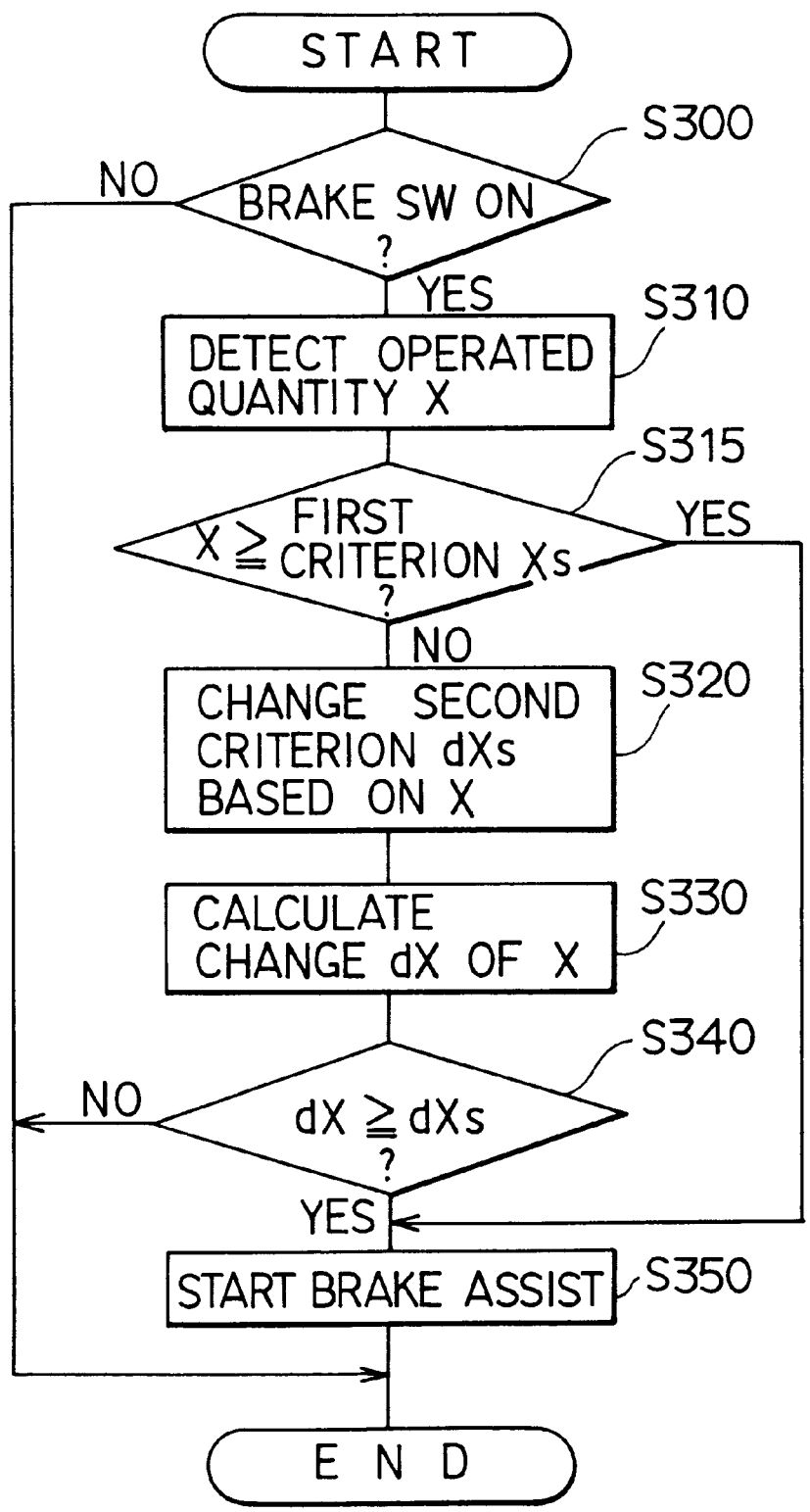
FIG. 8 is a flowchart indicating control processing of a third embodiment.

As indicated in the flowchart in FIG. 8, according to this embodiment, firstly, in step S300, it is determined whether the brake switch 23 is on. When the determination herein is affirmative, the processing advances to step S310; when the determination is negative, the processing is terminated.

In step S310, an operated quantity X indicating the position of the brake pedal 1 is detected based on the signal from the pedal-stroke sensor 23.

Figure 9:
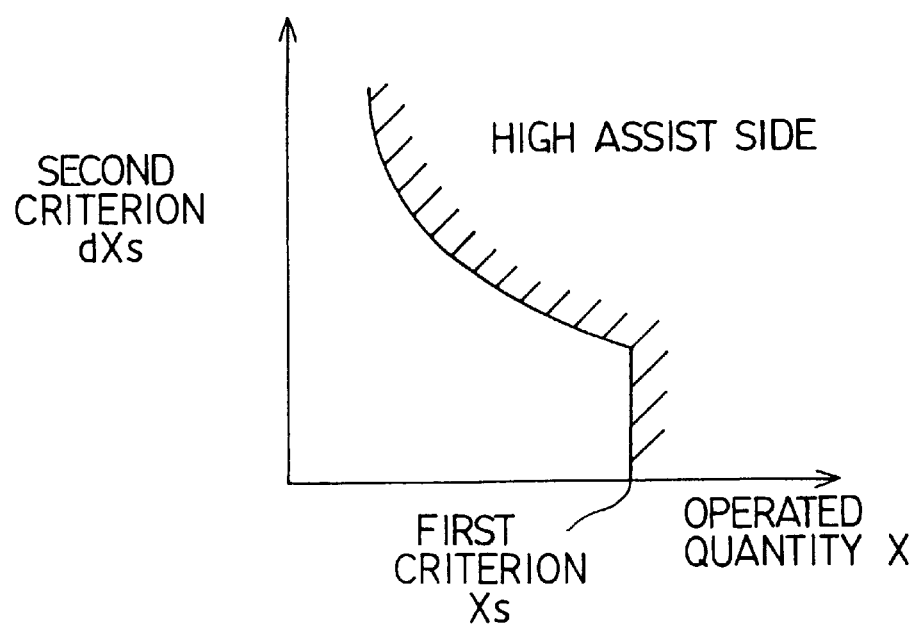
FIG. 9 is an explanatory diagram indicating a starting criterion of the third embodiment.

In step S315, it is determined whether the operated quantity X of the brake pedal 1 is at or above a predetermined operated-quantity threshold value (first starting criterion) Xs. In more detail, as shown in FIG. 9, it is determined whether the operated quantity X has reached operated-quantity threshold value (first starting criterion) Xs. When an affirmative determination is made herein, the processing advances to step S320; when a negative determination is made, the processing advances to step S350.

In step S320, a second starting criterion dXs for starting the brake assist is changed in accordance with the operated quantity X of the brake pedal 1. In more detail, an operation change-quantity threshold value (second starting criterion) dXs is determined in accordance with the operated quantity X from a map of the operation change-quantity threshold value dXs and the operated quantity X as shown in the FIG. 9. This second starting criterion is established as the operation change-quantity threshold value dXs for starting the brake assist.

Next, in step S330, the operated quantity X of the brake pedal 1 is differentiated, and operated-quantity change dX which is the operated speed of the brake pedal 1 is calculated.

Next, in step S340, it is determined whether the operated-quantity change dX of the brake pedal 1 is the operation change-quantity threshold value dXs or more. When an affirmative determination is made herein, the processing advances to step S350; when a negative determination is made, the processing is terminated.

In step S350, the timing for starting the brake assist is obtained, and so the pump 15 is driven to increase wheel-cylinder pressure. As a result, the brake assist is started, and the processing is terminated.

In this way, according to this embodiment, in an apparatus provided with the power brake composed of the pressure-amplifying device 10, the brake assist is started in a case where the operated quantity X (the position of the brake pedal 1) is at or above the operated-quantity threshold value (first starting criterion) Xs for starting the brake assist. In addition, the operated speed (operated-quantity change dX) of the brake pedal 1 are determined, the operation change-quantity threshold value (starting reference value) dXs for starting the brake assist is changed in accordance with the operated quantity X. In a case where the operated-quantity change dX has become this operation change-quantity threshold value dXs or more, the brake assist is started.

Therefore, the brake assist can reliably be performed no matter what the state of depression of the brake pedal 1 may be, and so there exists a remarkable effect that sufficient braking force can be ensured, similarly to the foregoing first embodiment. Further, the brake assist is performed in a case where the brake pedal 1 has been depressed by a predetermined quantity or more, and so there exists an advantage that computational processing is reduced.

(FOURTH EMBODIMENT)

A fourth embodiment will be described next.

According to this embodiment in particular, a G sensor is utilized to detect deceleration of the vehicle-body, and execution ("on") or stopping ("off") of the brake assist is switched in accordance with output therefrom.

Figure 10:
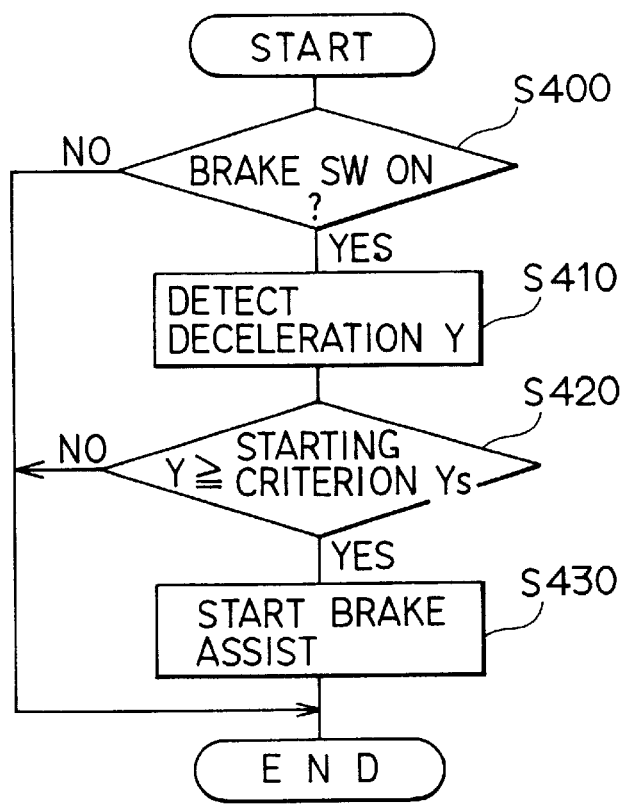
FIG. 10 is a flowchart indicating control processing of a fourth embodiment.

As indicated in the flowchart in FIG. 10, according to this embodiment, firstly, in step S400, it is determined whether the brake switch 23 is on. When the determination herein is affirmative, the processing advances to step S410; when the determination is negative, the processing is terminated.

In step S410, a body deceleration Y is detected on a basis of the signal from the G sensor.

Figure 11:
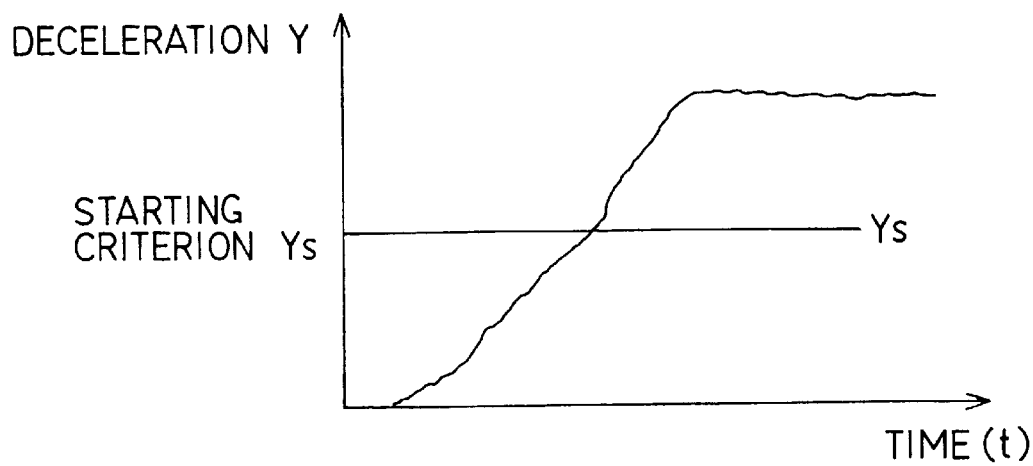
FIG. 11 is an explanatory diagram indicating a starting criterion of the fourth embodiment.

Next, in step S420, it is determined whether the body deceleration Y is at or above a predetermined body deceleration threshold value (starting criterion) Ys. In detail, it is determined whether the body deceleration Y which varies with the passage of time as shown in FIG. 11 has reached the body deceleration threshold value (starting criterion) Ys. When an affirmative determination is made herein, the processing advances to step S430; when a negative determination is made, the processing is terminated.

In step S430, the timing for starting the brake assist is obtained, the pump 15 is driven to increase the wheel cylinder pressure. As a result, the brake assist is started and then the processing is terminated.

In this way, according to this embodiment, in an apparatus provided with the power brake composed of the pressure-amplifying device 10, the brake assist is started in a case where the body deceleration Y is at or above the body deceleration threshold value Ys for starting the brake assist.

Therefore, the brake assist can reliably be performed no matter what the state of depression of the brake pedal 1 may be, and so there exists a remarkable effect that sufficient braking force can be ensured, similarly to the foregoing first embodiment. Further, processing of calculating the operated quantity change or of changing the operation change-quantity threshold value is not performed, and so there exists an advantage that computational processing is reduced.

It is to be noted that although the body deceleration Y is detected based on the signal from the G sensor, an assumed body speed or assumed body deceleration may be derived from, for example, a wheel speed detected by a wheel speed sensor according to a well-known calculation method.

(FIFTH EMBODIMENT)

Next, a fifth embodiment will be described.

In this embodiment, the brake control apparatus is applied in a vehicle of a diagonal brake-fluid conduit system provided with respective brake-fluid conduits of connecting front-right wheel cylinder with rear-left wheel cylinder and connecting front-left wheel cylinder with rear-right wheel cylinder in a front-wheel drive four-wheeled vehicle, similarly to the foregoing first embodiment. However, there is a characteristic in that, as a device performing a brake assist, booster is used for the replacement of the pressure amplifying device 10 in the first embodiment.

First, the structure of the brake control apparatus will be described based on a model diagram shown in FIG. 12.

Figure 12:
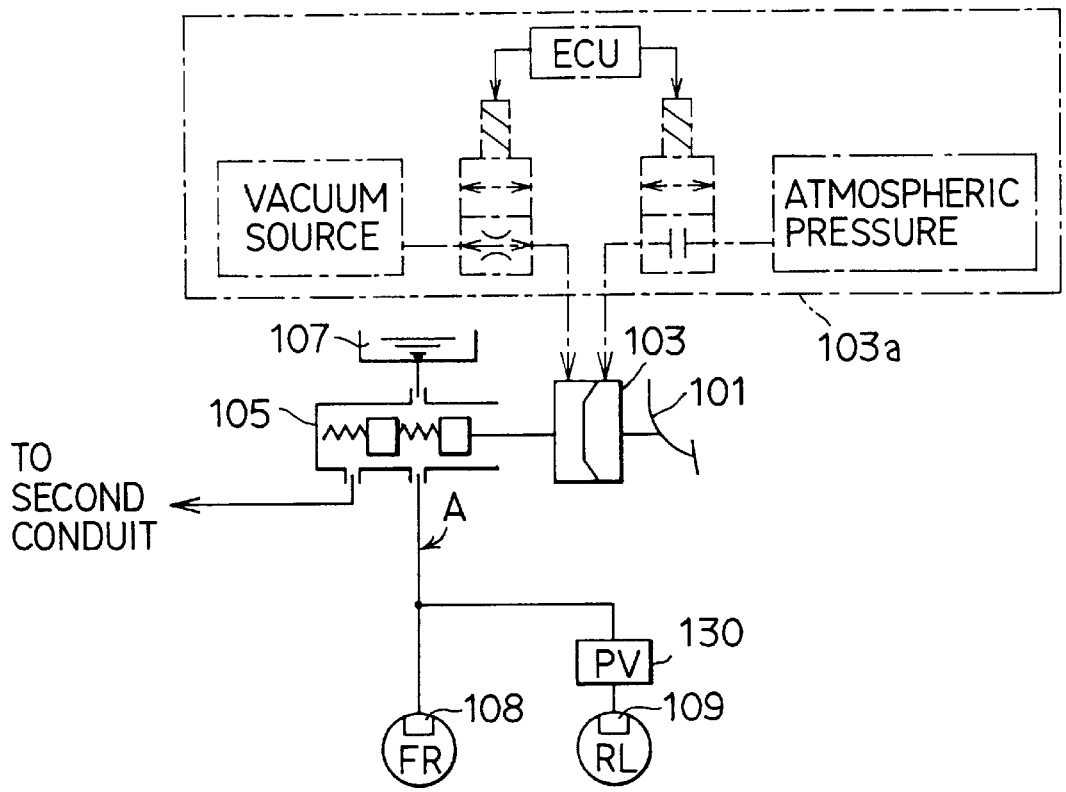
FIG. 12 is a model diagram indicating a structure of a brake control apparatus according to a fifth.

In FIG. 12, a brake pedal 101 which is depressed by a driver when applying braking force to a vehicle, is connected to a booster (vacuum booster) 103. Accordingly, depressing force applied to the brake pedal 101 and pedal stroke thereof are conveyed to the booster 103.

The booster 103 has at least two chambers, a first chamber and a second chamber, and for example the first chamber can be set as an atmospheric-pressure chamber and the second chamber can be set as a vacuum chamber. Intake-manifold vacuum of an engine, vacuum generated by a vacuum pump or the like is employed as vacuum introduced in the vacuum chamber. Accordingly, this booster 103 directly boosts the driver's pedal depression or pedal stroke by a pressure differential of the atmospheric-pressure chamber and the vacuum chamber. The booster 103 has a push rod or the like to convey the depression force or pedal stroke boosted in this way to a master cylinder 105, and this push rod generates master-cylinder pressure PU by compressing a master piston disposed in the master cylinder 105.

The master cylinder 105 is provided with an independent master reservoir 107 to supply brake fluid inside the master cylinder 105 or to accumulate excess brake fluid from the master cylinder 105.

The master-cylinder pressure PU generated in the master cylinder 105 is conveyed to brake fluid within a first conduit A linking the master cylinder 5 and a first wheel cylinder (W/C) 108 disposed in the front-right wheel FR to impart braking force to this wheel, and the master 105 and a second wheel cylinder 109 disposed in the rear-left wheel RL to impart braking force to this wheel. The master-cylinder pressure PU is similarly conveyed also to a second conduit linking respective wheel cylinders disposed in the front-left wheel and the rear-right wheel to the master cylinder 105. However, because structure similar to the first conduit A can be employed for the second conduit, detailed description will be omitted.

It is to be noted that a proportioning control valve 130 as well-known (similar to the foregoing proportioning control valve 13) may be disposed at a conduit at the side of the rear-left wheel RL to operate so that the brake fluid pressure applied to the second wheel cylinder 109 becomes smaller than the brake-fluid pressure applied to first wheel cylinder 108.

In particular, according to this embodiment, the booster 103 generates a pressure differential of the atmospheric-pressure chamber and vacuum chamber (booster 103; ON) when required. That is, the booster 103 is used to switch the brake assist on and off. In detail, the booster 103 is turned on or off depending on a changed starting criterion of the brake assist, similar to the processing shown in the flowchart of FIG. 5.

That is, according to the present embodiment, in an apparatus provided with a power brake composed of the booster 103, first, the position (operated quantity X) and speed (operated quantity change dX) of the brake pedal 101 are determined. Then, the operation change-quantity threshold value (starting criterion) dXs is changed in response to the operated quantity X. When the operated quantity change dX is at or above the starting criterion dXs, the booster 103 is turned on to start the brake assist.

Therefore, the brake assist can reliably be performed no matter what the state of depression of the brake pedal 101 may be, and so there exists a remarkable effect that sufficient braking force can be ensured, similarly to the foregoing first embodiment.

The booster 103 may not only be turned on and off but also variably control the pressure differential of the atmospheric-pressure chamber and vacuum chamber in response to the starting criterion. In this case, for example, a pressure control device 103*a* as shown in FIG. 12 is provided to the booster 103. To increase the brake assist, negative pressure in the vacuum chamber may be strengthened or pressure in the atmospheric-pressure chamber may be increased. On the other hand, when reducing the brake assist, a passage connecting the atmospheric-pressure chamber and vacuum chamber may be controlled to alternatively open and closed states.

The present invention is not limited to the foregoing embodiments but can be modified in various ways as described below.

Figure 13:
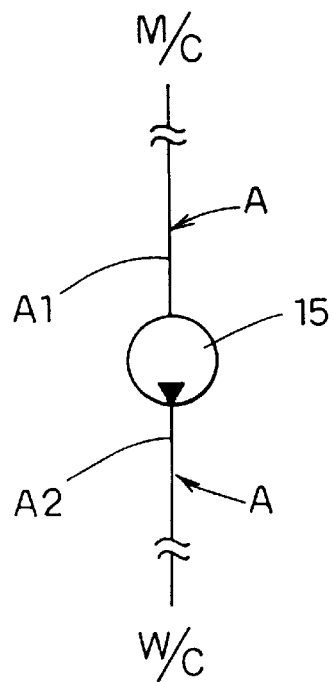
FIG. 13 is a drawing indicating a modification of the pressure amplifying device.

(1) In the first embodiment, the pressure amplifying device 10 was composed of the pump 15 and the proportional control valve 13. However, the pressure amplifying device 10 is not limited to this, a simple structure that is composed of only the pump 15 disposed in the first conduit A as shown in FIG. 13 can be adopted as the pressure amplifying device 10.

(2) In the first embodiment, the following devices can be adopted instead of the proportioning control valve 13.

Figure 14A:
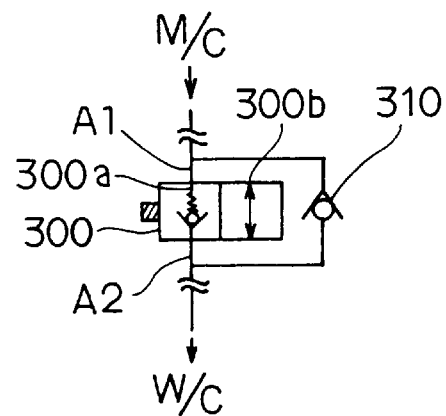
FIGS. 14A to 14C are drawings indicating detailed structure of the modification of the holding device in addition to a proportioning control valve.

(2-1) As shown in FIG. 14A, a two-way solenoid valve 300 which has a port 300*a* inserted a differential pressure valve therein and a port 300*b* to realize a communicated state can be used instead of the proportioning control valve 13. It is to be noted that a check valve 310 is connected in parallel to the two-way solenoid valve 300.

Figure 14B:
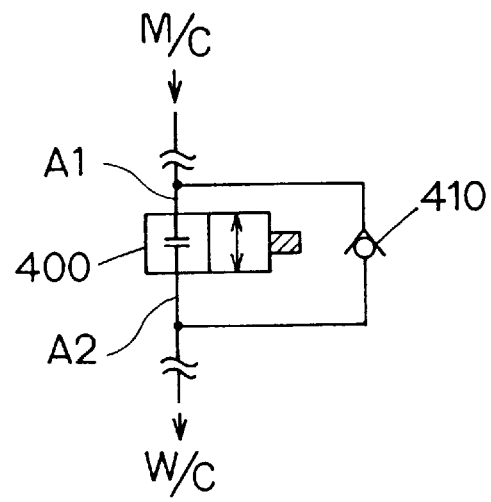

(2-2) As shown in FIG. 14B, a two-way solenoid valve 400 provided merely with an interrupted position and a communicated position can be employed instead of the proportioning control valve 13. It is to be noted that a check valve 410 is connected in parallel to the two-way solenoid valve 400.

Figure 14C:
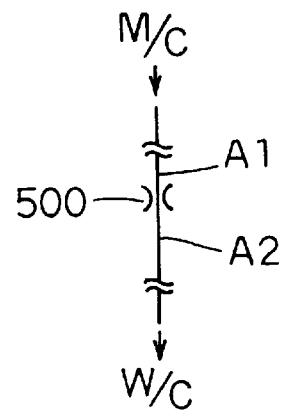

(2-3) As shown in FIG. 14C, a restrictor 500 can be employed instead of the proportioning control valve 13.

(3) In the first embodiment, amplification of brake fluid quantity with respect to the second conduit part A2 by the pressure amplifying device 10 was performed with respect to both the front-right wheel FR and the rear-left wheel RL. However, amplification of brake fluid quantity by the pressure amplifying device 10 may be performed only at the front-right and front-left wheels. There may be cases wherein assurance of braking force in the rear-right and rear-left wheels cannot be expected due to load movement occurring during vehicle braking. When great load movement occurs, it even arises possibility that the rear wheels become prone to slippage when large braking force is applied to the rear wheels. In such a case, efficient braking force can be gained by performing pressure amplification only at the front-right and front-left wheels.

(4) Because brake fluid pressure can be increased by the pressure amplifying device 10, it is possible to reduce the capacity of the booster 3 provided in the foregoing embodiments and make the booster 3 compact, or even to eliminate the booster 3. That is to say, the load on pedal depression force by the driver can be sufficiently lessened and high braking force can be ensured even when there is no pressure-increasing action on the master-cylinder pressure by the booster 3. To the contrary, even if the pressure amplifying device 10 is eliminated, high braking force can be ensured only with the booster.

(5) In the foregoing embodiments, an apparatus described therein was not provided with an anti-skid control system. However, the present invention can apply to the anti-skid control system that has a well-known fluid-pressure increasing control valve, fluid-pressure decreasing control valve, reservoir and so on. In this case, there is an advantage that braking force on a road having high friction coefficient can be enhanced.

(6) In the first embodiment, the operated quantity of the brake pedal was detected, and the starting criterion of the brake assist was changed in response to the operated quantity. However, master-cylinder pressure, for example, is detected by a pressure sensor and the starting criterion of the brake assist may be changed in response to the master-cylinder pressure. Or, a depressing force on the brake pedal is detected by the pressure sensor, and the starting criterion may be changed in response to the depressing force.

(7) In the first embodiment, the operated speed of the brake pedal was adopted as the starting criterion. However, an operated acceleration of the brake pedal can be adopted in the replacement of the operated speed. When the brake pedal is rapidly depressed rapidly, the operated acceleration of the brake pedal becomes large and it can be assumed to be panicky condition that large braking force is necessary. Therefore, the operated acceleration of the brake pedal can be used as the starting criterion.

(8) Although the starting criterion was automatically changed in response to the operated quantity of the brake pedal as stated above, it may be manually changed by a driver while the driver takes road surface conditions or surrounding environmental conditions (for example, low temperature) into considerations. As a result, optimal braking force can be obtained based on the driver's determination.

What is claimed is:

1. A brake control apparatus for a vehicle, comprising:
   a brake-fluid pressure generating device which has a generating source to generate a first brake-fluid pressure to apply braking force to a vehicle;
   a brake pedal which conveys a depressing force thereon to said brake-fluid pressure generating device;
   a wheel braking force generating device which causes braking force to be generated at a wheel;
   a brake assisting device which provides a second brake fluid pressure higher than said first brake fluid pressure for said wheel braking force generating device;
   a starting device which causes said brake assisting device to start brake assisting when a physical quantity varied in response to a braking state has reached a predetermined starting criterion;
   an operated quantity detecting device which detects a value corresponding to an operated quantity of said brake pedal; and
   a starting criterion changing device which changes said predetermined starting criterion in response to said value corresponding to said operated quantity of a current operation of said brake pedal.

2. A brake control apparatus for a vehicle as recited in claim 1, wherein said value corresponding to said operated quantity of said brake pedal is a depressed position of said brake pedal.

3. A brake control apparatus for a vehicle as recited in claim 1, wherein said value corresponding to said operated quantity of said brake pedal is a pedal stroke of said brake pedal.

4. A brake control apparatus for a vehicle as recited in claim 1, wherein said value corresponding to said operated quantity of said brake pedal is a value of said first brake-fluid pressure generated by said brake-fluid pressure-generating device.

5. A brake control apparatus for a vehicle as recited in claim 1, wherein said value corresponding to said operated quantity of said brake pedal is depression force of a driver with respect to said brake pedal.

6. A brake control apparatus for a vehicle as recited in claim 1, wherein said physical quantity varied in response to a braking state is an operational speed which is a change in said operated quantity of said brake pedal.

7. A brake control apparatus for a vehicle as recited in claim 1, wherein said physical quantity varied in response to a braking state is an operational acceleration which is a change in said operating speed of said brake pedal.

8. A brake control apparatus for a vehicle, comprising:
   a brake-fluid pressure generating device which has a generating source to generate a first brake-fluid pressure to apply braking force to a vehicle;
   a brake pedal which conveys a depressing force thereon to said brake-fluid pressure generating device, wherein said first brake-fluid pressure represents a value corresponding to the brake pedal depressing force;
   a wheel braking force generating device which causes braking force to be generated at a wheel;
   a brake assisting device which provided a second brake fluid pressure higher than said first brake fluid pressure for said wheel braking force generating device;
   an operated quantity detecting device which detects a value corresponding to an operated quantity of said brake pedal, said operated quantity being non-time dependent; and
   a starting device which causes said brake assisting device to start brake assisting when said value corresponding to said operated quantity of said brake pedal has reached a predetermined determination value.

9. A brake control apparatus for a vehicle as recited in claim 8, wherein said value corresponding to said operated quantity of said brake pedal is a depressed position of said brake pedal.

10. A brake control apparatus for a vehicle as recited in claim 8, wherein said value corresponding to said operated quantity of said brake pedal is a pedal stroke of said brake pedal.

11. A brake control apparatus for a vehicle as recited in claim 8, wherein said value corresponding to said operated quantity of said brake pedal is a value of said first brake-fluid pressure generated by said brake-fluid pressure-generating device.

12. A brake control apparatus for a vehicle as recited in claim 8, wherein said value corresponding to said operated quantity of said brake pedal is depression force of a driver with respect to said brake pedal.

13. A brake control apparatus for a vehicle, comprising:
   a brake-fluid pressure generating device which has a generating source to generate a first brake-fluid pressure to apply braking force to a vehicle;
   a brake pedal which conveys a depressing force thereon to said brake-fluid pressure generating device;
   a wheel braking force generating device which causes braking force to be generated at a wheel;
   a brake assisting device which provides a second brake fluid pressure higher than said first brake fluid pressure for said wheel braking force generating device;
   a deceleration detecting device which detects deceleration of a vehicle body; and
   a starting device which causes said brake assisting device to start brake assisting when said deceleration of said vehicle body has reached a predetermined deceleration determination value.

14. A brake control apparatus for a vehicle, comprising:
   a brake pedal which is operated by a driver during braking;
   a wheel braking force generating device which generate a first braking force at a wheel, said first braking force corresponding to an operated quantity of said brake pedal;
   a sudden braking determination device which determines whether sudden braking is executed by a driver based on both of said operated quantity and an operational speed of said brake pedal, said operated quantity being non-time dependent; and
   a brake assisting device which generates a second braking force at a wheel larger than said first braking force when said sudden braking determination device determines that said sudden braking has been executed.

15. A brake control apparatus for a vehicle as recited in claim 14, wherein said sudden braking determination device determines that said sudden braking has been executed in a case where at least one of conditions that said operated quantity of said brake pedal has reached a first predetermined value and that said operational speed of said brake pedal has reached a second predetermined value which is changed in response to said operated quantity of said brake pedal, has been fulfilled.

16. A brake control apparatus for a vehicle as recited in claim 14, wherein said sudden braking determination device determines that said sudden braking has been executed in a case where said operational speed of said brake pedal has reached a starting criterion which is changed in response to said operated quantity of said brake pedal.

17. A brake control apparatus for a vehicle, comprising:
   a braking force applying device which applies braking force to a wheel;
   a brake assisting device which intensifies said braking force applied to said wheel by said braking force applying device;
   a starting device which starts an operation of said brake assisting device when a first parameter varied in response to a braking state of said vehicle has reached a predetermined starting criterion; and
   a starting criterion changing device which changes said predetermined starting criterion in response to a second parameter which is also varied in response to said braking state of said vehicle,
   wherein said first parameter is an operational speed of a brake pedal and said second parameter is a brake pedal stroke, and when said brake pedal stroke is relatively small, a relatively large brake pedal operational speed is set as said predetermined starting criterion, and when said brake pedal stroke is relatively large, a relatively small brake pedal operational speed is set as said predetermined starting criterion.

* * * * *